March 5, 1957 W. J. MECKOSKI 2,783,655
SPEED SELECTOR
Filed Dec. 16, 1953 2 Sheets-Sheet 1
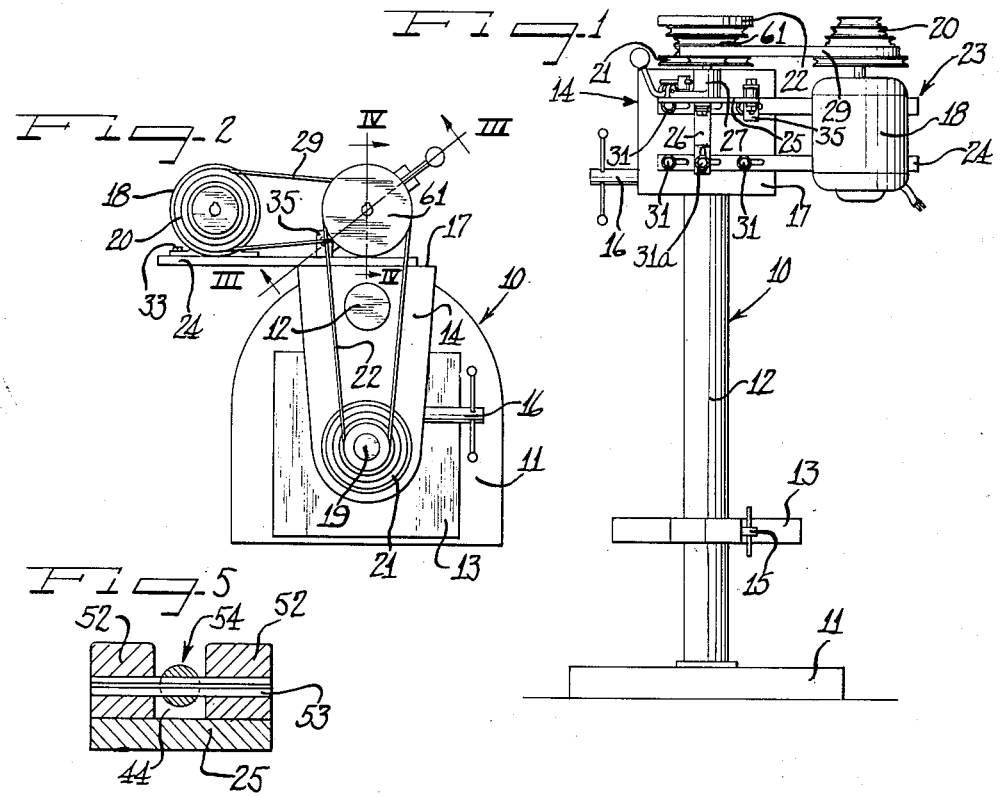
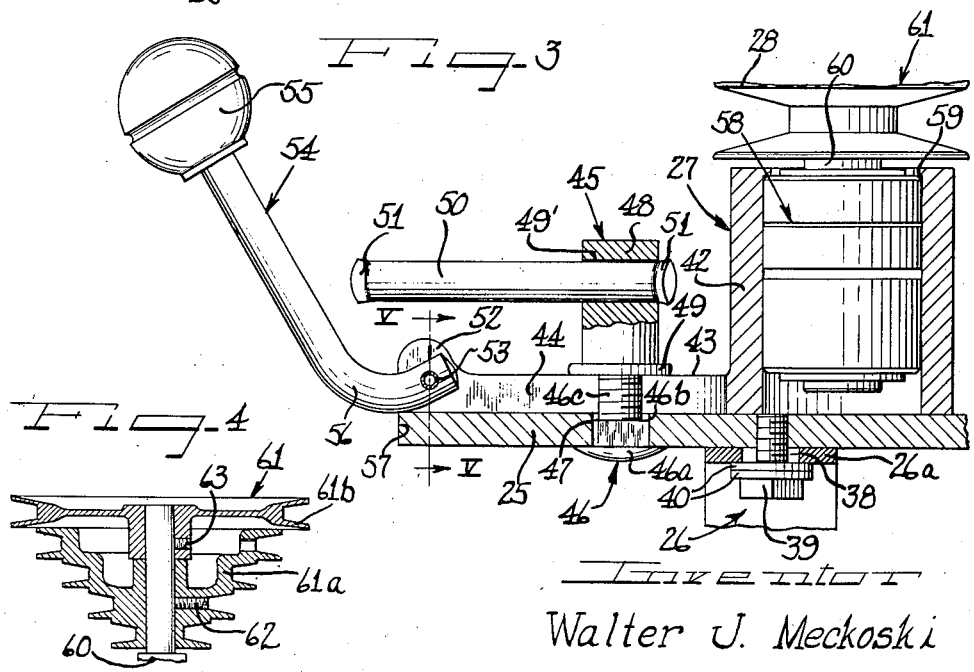
Inventor
Walter J. Meckoski

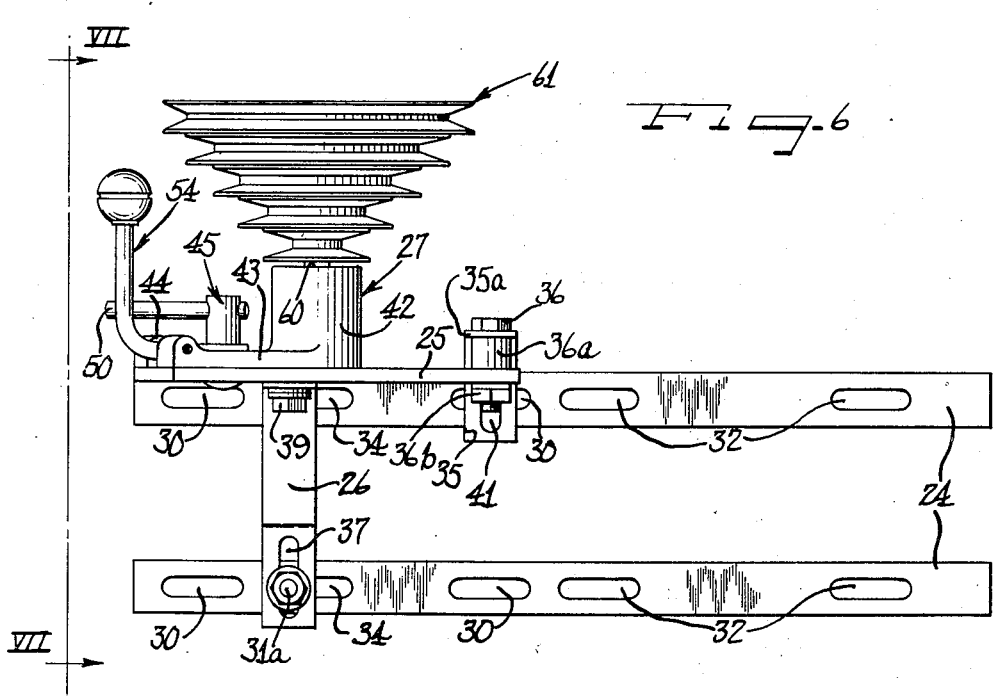
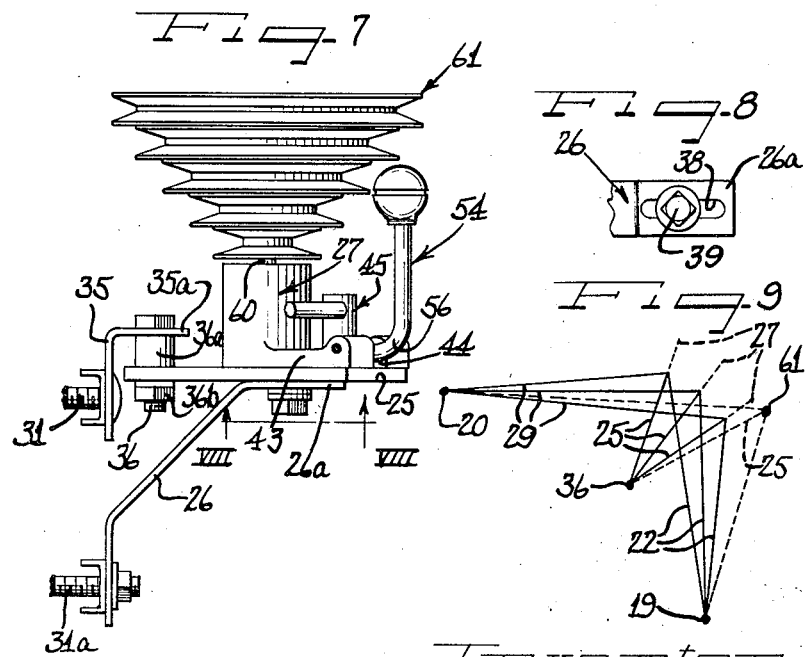

United States Patent Office 2,783,655
Patented Mar. 5, 1957

2,783,655

SPEED SELECTOR

Walter J. Meckoski, Chicago, Ill.

Application December 16, 1953, Serial No. 398,540

5 Claims. (Cl. 74—242.1)

This invention relates to an attachment for power tools and the like to increase the operating speed ranges of the tools. More particularly, this invention relates to an attachment for drill presses to incorporate additional speed flexibility in the operation of the press.

In accordance with this invention, a compound drive attachment is mounted on the motor mount of a drill press or the like power tool. This compound drive attachment includes channel strips bolted to the motor support base of the press to carry the motor on the ends thereof which extend from the base and to adjustably support a floating selector head pulley. This selector head pulley has a plurality of belt grooves of different diameters to selectively receive belts from the motor and from the drill press head pulley. The selector head pulley is adjustable on the strips to positions which will receive both belts in the pre-selected pulley grooves to give the desired driving ratio between the motor and the drill press head pulley. A tensioning device is provided on the floating selector head to take the slack out of the belts.

In operation, the motor has the multiple pulley thereon driving a belt in a selected groove thereof. The floating head pulley has an inverted multiple pulley receiving the other end of the belt in a selected groove to provide a desired drive reduction or drive increase. The drive head of the drill press has a multiple pulley thereon receiving a second belt. This second belt is likewise trained around the floating head pulley and the grooves of the respective pulleys are selected to give the desired drive increase or decrease. The interposed floating head pulley or idler pulley thereby materially increases the driving speed ratios between the motor and the press head pulley. Utilization of an idler head pulley with five different pulley grooves in combination with motor and press head pulleys having four or more pulley grooves, gives almost any desired speed for the drill press without requiring a variable speed motor. The pulleys are arranged so that the smallest pulley on the motor is at the level of the largest pulley on the selector while the smallest pulley on the selector is in alignment with the largest pulley on the drill press. The selector preferably has one more pulley groove than the drill press since it receives both belts therearound.

A feature of this invention resides in the provision of a selector pulley with an interchangeable large diameter pulley element that can be selectively mounted on the unit for further varying the desired speed range of the drill press.

Another feature of this invention resides in the provision of an adjustable mounting for the idler or selector pulley which will accommodate even or uneven elongations of the belts to maintain them in good driving engagement in their respective pulley grooves.

A still further feature of this invention resides in the provision of an easily shiftable tensioning device for the idler pulley.

It is then an object of this invention to provide a speed selector for motor-driven apparatus which will increase the driving range of the apparatus without varying the speed of the motor.

Another object of this invention is to provide a speed selector attachment for power tools and the like.

A still further object of this invention is to provide a simplified attachment for drill presses and the like which is easily mountable on the motor support base of the drill press to increase the speed ratios between the motor and the press without varying the speed of the motor.

A still further object of this invention is to provide a speed selector having mounting brackets adapted to carry an electric motor and to be mounted on the conventional motor base of a power tool or the like.

A still further object of this invention is to provide a selector pulley which is operatively mounted between the motor and the power tool.

A further and specific object of this invention is to provide a cam lever for adjusting the tension of a plurality of drive belts for a power tool or the like.

This invention will hereinafter be specifically described as embodied in a drill press but it should be understood that the principles of this invention are adaptable to any type of motor-driven apparatus and that the invention provides a means for decreasing and increasing the speeds of any apparatus without varying the speeds of the motor driving that apparatus.

It is then to be understood that the above and further features and objects of this invention will become apparent to those skilled in the art from the following detailed description of the annexed sheets of drawings which, by way of a preferred example only, illustrate one embodiment of the invention.

On the drawings:

Figure 1 is a rear end elevational view of an electric motor-driven drill press equipped with the speed selector of this invention.

Figure 2 is a top plan view of the assembly of Figure 1.

Figure 3 is an enlarged cross-sectional view, with parts in elevation, taken along the line III—III of Figure 2.

Figure 4 is an enlarged cross-sectional view, with parts in elevation, taken along the line IV—IV of Figure 2.

Figure 5 is an enlarged cross-sectional detail view taken along the line V—V of Figure 3.

Figure 6 is a rear elevational view of the attachment apparatus of this invention.

Figure 7 is an end elevational view of the apparatus of Figure 6 taken along the line VII—VII of Figure 6.

Figure 8 is a fragmentary bottom plan view taken along the line VIII—VIII of Figure 7.

Figure 9 is a diagrammatic view illustrating the manner in which the floating selector pulley is adjustable to accommodate tightening of both belts.

As shown on the drawings:

In Figures 1 and 2, the reference numeral 10 designates generally a drill press having a mounting base or bed 11, an upstanding column 12, a work support 13 on the column 12, and a head 14 on the column 12 above the work support 13. Clamping mechanisms 15 and 16 are provided to selectively adjust the levels of the work support 13 and head 14 on the column 12.

The head 14 has a vertical motor support base 17 on the back thereof which conventionally carries an electric motor 18 for driving the head shaft 19 of the drill press. This head shaft is carried by the head 14 above the work support base 13 and depends vertically from the head 14. The motor 18 is conventionally equipped with a multi-groove pulley 20 and the head shaft 19 is conventionally equipped with a similar multi-groove pulley 21. A belt 22 conventionally drives the pulley 21 direct from the pulley 20.

The speed selector attachment of this invention is mounted on the motor base 17 in place of the motor 18. This attachment is designated generally by the reference numeral 23 and includes a pair of channel strips 24, a support plate 25, an angle bracket or strip 26, a shiftable bearing head 27 carrying a multiple groove pulley 28 and a belt 29.

As best shown in Figure 6, the channel strips 24 are provided with pairs of elongated slots 30 receiving mounting bolts 31 (Figures 1 and 7) to secure the strips on the motor mounting base 17 for extending in spaced parallel relation beyond the base. Additional pairs of elongated slots 32 are also provided on the strips 24 to receive motor mounting bolts 33.

An additional slot 34 is provided in each strip 24 between the slots 30 and the slot 34 in the bottom strip 24 receives a mounting bolt 31a for the angle bracket 26. This angle bracket 26 also has a slot 37 in the lower end thereof receiving the bolt 31a.

The intermediate slot 30 in the upper strip 24 receives an angle bracket 35 thereover and held thereon by a mounting bolt 31. This angle bracket 35 has a rearwardly extended horizontal leg 35a overlying the support plate 25 and a pivot bolt 36 depends from this leg 35 to carry the support plate 25 on the bracket. A spacer 36a on the bolt 36 holds the support plate 25 in spaced relation beneath the horizontal leg 35a. A suitable nut 36b on the bolt is provided beneath the plate 25.

As shown in Figure 8, the upper end of the angle bracket 26 has a horizontal slotted leg 26a with an elongated slot 38 receiving a cap screw 39 therethrough. The cap screw 39 is threaded into the support plate 25 as best shown in Figure 3 and a pair of washers 40 on the cap screw 39 underlie the leg 26a to facilitate adjustment of the support plate 25 on the bracket 26 without permitting the head of the cap screw to become wedged in the slot 38.

It will be noted in Figure 6 that the bracket 35 has the vertical leg thereof equipped with an elongated longitudinal slot 41 accommodating vertical adjustment of the bracket so that the plate 25 can be raised or lowered relative to the channel strips 24. The elongated vertical slot in the lower portion of the angle bracket 26 accommodates this vertical adjustment of the plate 25.

The bearing housing 27 on the plate 25 includes a vertical tubular portion 42 with a yoke arm or stem 43 extending laterally from the bottom thereof. This stem 43 has a gap 44 between the yoke arms thereof and a lock nut assembly 45 extends through this gap to overlie the stem 43 for securing the member 27 on the support plate 25. As best shown in Figure 3, this lock nut assembly 45 includes a carriage bolt 46 with a head 46a underlying the plate 25, a square shoulder 46b fitted into a square hole 47 in the plate 25, and a threaded shank 46c extending through the slot 44 and receiving in threaded relation thereon a nut 48 having a collar 49 on the bottom end thereof spanning the gap 44 to overlie both legs of the stem 43. This nut 48 has a horizontal bore 49' through the top end portion thereof slidably receiving a rod-like handle 50 with enlarged tapered ends 51 adapted to be selectively wedged into the hole 49 to hold the handle against sliding movement in the nut and thereby eliminate vibration.

The ends of the legs of the stem 43 are enlarged at 52 to provide bearing bosses receiving a pin 53 therethrough. The pin 53 extends across the gap 44 and carries a cam handle 54 in swingable relation on the stem. The pin 53 is a cleft spring tube having a free diameter greater than the holes through the bosses 52 and the hole through the end of the handle 54 so that the handle will be tightly engaged on the pin and the pin will be tightly engaged in the bosses. The pin in attempting to reclaim its free expanded diameter condition will retain the cam handle in snug mounted relation so that it will not rattle or vibrate.

The cam handle 54 preferably has a ball knob 55 on the end thereof and has a rounded knee or elbow 56 adjacent the pin 53. This elbow is adapted to rock over the edge 57 of the plate 25 to effect a sliding movement of the bearing housing 27 on the plate for a purpose to be more fully hereinafter described.

The tubular portion of the housing 27 has a vertical bore therein into which is press fitted the outer race ring of an anti-friction bearing 58. The upper end of this bore is somewhat undersized to provide a shoulder 59 which will retain the bearing against upward movement out of the open top end of the housing.

The inner race ring of the bearing 58 supports a vertical shaft 60 and the speed selector or idler pulley 61 is fixedly mounted on this shaft.

As best shown in Figure 4, the pulley 61 preferably is composed of a four-step or four-groove one-piece pulley 61a secured on the shaft 60 by a set screw 62 and a top large diameter pulley 61b separate from the pulley 61a and secured on the shaft by means of a set screw 63. This pulley 61b is interchangeable with small and large diameter pulleys to give a further adjustment for the speed selector of this invention.

In mounting the attachment 23 on the power tool 10, the pulleys 20, 21 and 61 are arranged so that the smallest diameter groove of the pulley 20 is level with the largest diameter groove of the selector pulley 61 while the largest diameter groove of the pulley 21 is level with the smallest diameter groove of the selector pulley 61. The belts 22 and 29 are then arranged in the desired grooves of the respective pulleys to produce the desired driving ratio between the motor 18 and the drill shaft 19. The support plate 25 is then swung on its pivot bolt 36 to take the slack out of both belts. The support plate 25 will, of course, carry the bearing housing therewith and the swinging movement of the support plate about its pivot 36 will be accommodated due to the slotted connections for the angle bracket mounting bolts 31a and 39. These bolts are then tightened to lock the support plate in its adjusted position. The clamping nut or lock nut assembly 45 is then loosened and the cam handle 54 is tilted downwardly to rock the knee or elbow 56 against the edge 57 thereby drawing the bearing housing away from both pulleys 20 and 21 to tighten the belts 22 and 29.

As shown in the diagram of Figure 9 the belts 22 and 29 may be considered to be anchored about pivots represented by their pulleys 19 and 20 while the support plate 25 is swingable about its pivot 36 to selective positions in angular relation to both belts. It will be obvious that an extension provided by the bearing housing 27 on the support plate 25 will automatically tighten both belts. As shown in dotted lines, if one of the belts becomes elongated more than the other belt, the arm support plate 25 can be swung accordingly to accommodate this uneven extension and the bearing housing 27 when extended on the angularly adjusted support plate will move the selector pulley 61 to a position for tightening both belts.

Once the adjustment is made and both belts are tight, it is a simple matter to again tighten the lock nut 45 to hold the assembly in adjusted position.

When it is desired to make a change in the speed ratio, the lock nut 45 is loosened and the tension of the belts will pull the bearing housing 27 so that the belts can be changed to different grooves on the pulleys. Angular adjustment of the support plate 25 is only needed when the belts stretch unevenly.

From the above description it will, therefore, be understood that this invention provides a simple, inexpensive attachment for motor-driven machinery which will accommodate many speed ratios between the motor and the driven part of the machine without necessitating the use of a multi-speed motor. The device of this invention is easily installed and is quickly adjustable to accommodate the different driving speeds. It is preferred that the idler pulley or selector unit of this invention have one more groove or pulley than is provided on the motor-driven parts of the machine. This additional pulley groove on the idler pulley gives an added speed selection since both belts are entrained around the idler pulley whereas only one belt is trained around the motor pulley and the driven part of the power tool or other apparatus. The idler pulley being vertically adjustable, can be positioned to selectively align its extra groove with the desired grooves in the motor pulley and the driven power tool pulley.

It will be understood that modifications and variations may be effected without departing from the scope of the novel concepts of this invention.

I claim as my invention:

1. A speed selector attachment for motor-driven machinery which comprises a pair of mounting strips adapted to be fixedly mounted on the motor support base of the machine, a support swingably mounted on at least one of said strips, an angle bracket adjustably mounted on at least one of said strips for carrying said support in angular relation relative to said strips, a bearing housing slidably mounted on said support, a lock nut locking said bearing housing on said support, a cam handle on said bearing housing coacting with said support to slide the bearing housing on the support to selected positions, a pulley carried by said bearing housing adapted to receive belts therearound, and a motor mounting on said strips adapted to support a motor for driving one of said belts.

2. A speed selector attachment for electric motor-driven machinery which comprises a pair of elongated spaced parallel strips having elongated slots at spaced intervals, mounting bolts extending through some of said slots for securing said strips in spaced parallel relation on machinery to be driven thereby, additional mounting bolts extending through other of said slots adapted for attaching a driving motor to said strips, an angle bracket vertically adjustable on one of said strips, a support plate swingably mounted on said angle bracket, an angle strip adjustably mounted on said support plate and on the other of said strips for securing the support plate in desired angular relation relative to the strips and accommodating vertical adjustment of the support plate relative to the strips, a bearing housing slidably mounted on said support plate having a rotatable member, a multi-groove pulley mounted on said rotatable member, a bearing in said housing carrying said pulley, said bearing housing having a laterally extending yoked stem, a bolt extending from said support plate between the yokes of said stem, a lock nut on said bolt overlying the stem for clamping the bearing housing on the support plate in adjusted position, a bent handle pivotally mounted on the end of said stem and having a knee portion engageable with the edge of the support plate and effective to shift the bearing housing on the support plate, said multi-groove pulley being adjustable vertically relative to said mounting strips, being adjustable about the angle bracket into desired angular relation with the mounting strips, and being adjustable horizontally on said support plate.

3. In a power tool having a multi-groove driven pulley and an electric motor-driven multi-groove driving pulley the improvement of an attachment on said power tool including carrier means for carrying said motor, a supporting member pivotally connected to said carrier means, a yoke mechanism longitudinally mounted on said supporting member, a rotatable pulley mounted on said yoke mechanism and a leverage arm pivotally mounted between ends of said yoke mechanism and fulcruming on said supporting member end for shifting said pulley relative to its supporting member to tension belts received therearound.

4. A speed adjusting attachment for power tools and the like which comprises carrier means, a support plate pivotally mounted on said carrier means, a bearing housing shiftably mounted on said support plate, an idler pulley carried by said bearing housing to receive endless belts thereround, and a cam handle carried by said bearing housing and fulcrumed on said support plate to shift the bearing housing on the support plate to vary the tension of the belts.

5. In a drive mechanism for a power tool and the like which includes an idler pulley positioned between driving and driven pulleys of a power tool having belts therearound extending in angular relation to each other, a slidably adjustable support on which the idler pulley is adjustably carried, means cooperable with said support for bodily shifting the idler pulley lengthwise of the support to vary the tension of the idler pulley belt, and adjustable fastener means connected to said support for holding said support in a given angular position on the tool and adjustable to vary fixedly the spaced angular relation of the idler pulley with respect to the driving and driven pulleys.

References Cited in the file of this patent

UNITED STATES PATENTS

| | | |
|---|---|---|
| 2,073,704 | Mitchell | Mar. 16, 1937 |
| 2,441,775 | Simonson | May 18, 1948 |
| 2,650,506 | Montgomery | Sept. 1, 1953 |